United States Patent
Direnzi et al.

(10) Patent No.: US 11,788,491 B1
(45) Date of Patent: Oct. 17, 2023

(54) SYSTEMS AND METHODS FOR ATTACHMENT OF MATERIALS HAVING DIFFERENT THERMAL EXPANSION COEFFICIENTS

(71) Applicant: General Electric Company, Schenectady, NY (US)

(72) Inventors: Nicholas Direnzi, Cincinnati, OH (US); John Philip McKay, Boca Raton, FL (US); Apostolos Karafillis, Winchester, MA (US); David L. Dawson, North Bend, OH (US); Rosa Nemec, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/863,993

(22) Filed: Jul. 13, 2022

(51) Int. Cl.
*F02K 1/80* (2006.01)

(52) U.S. Cl.
CPC .......... *F02K 1/80* (2013.01); *F05D 2220/323* (2013.01); *F05D 2260/31* (2013.01); *F05D 2300/6033* (2013.01)

(58) Field of Classification Search
CPC ... F02K 1/80; F02K 1/822; F02K 1/82; F23R 3/60; F01D 25/28; Y10T 403/21; Y10T 403/217; Y10T 403/64; Y10T 403/645; F05D 2220/323; F05D 2260/31; F05D 2300/6033
See application file for complete search history.

(56) References Cited

U.S. PATENT DOCUMENTS

| | | |
|---|---|---|
| 4,748,806 A | 6/1988 | Drobny |
| 4,792,475 A | 12/1988 | Bien |
| 4,971,497 A | 11/1990 | Stoffer |
| 5,275,529 A | 1/1994 | Langenbrunner |
| 5,451,116 A | 9/1995 | Czachor |
| 6,773,215 B2 | 8/2004 | Cuva |
| 8,607,577 B2 | 12/2013 | Ruberte Sanchez |
| 9,638,133 B2 | 5/2017 | Kramer |
| 10,119,424 B2 | 11/2018 | Karafillis |
| 10,316,695 B2 | 6/2019 | Renggli |
| 10,422,532 B2 | 9/2019 | Sadil |
| 10,907,508 B2 | 2/2021 | Knight |
| 11,215,367 B2 | 1/2022 | Kramer |

(Continued)

FOREIGN PATENT DOCUMENTS

| | | |
|---|---|---|
| EP | 2607632 | 6/2013 |
| EP | 3540314 | 9/2019 |
| WO | 2014058502 | 4/2014 |

*Primary Examiner* — Todd E Manahan
*Assistant Examiner* — Rodolphe Andre Chabreyrie
(74) *Attorney, Agent, or Firm* — Fitch, Even, Tabin & Flannery, LLP (57) ABSTRACT

Systems and methods for attaching a protective liner to a an aircraft engine component having a different coefficient of thermal expansion in comparison to the protective liner include a mounting member configured to be mounted to the aircraft engine component and an attachment member configured to be attached to the protective liner. The mounting member and the attachment member are coupled to each other such that a portion of the mounting member is received within a portion of the attachment member and such that the mounting member is permitted to move with both radial and rotational freedom relative to the attachment member.

17 Claims, 7 Drawing Sheets

(56) References Cited

U.S. PATENT DOCUMENTS

| | | | |
|---|---|---|---|
| 11,326,551 B1* | 5/2022 | Sutterfield | F02K 1/52 |
| 2014/0047849 A1* | 2/2014 | Kramer | F02K 1/82 |
| | | | 29/889.22 |
| 2015/0226083 A1* | 8/2015 | Renggli | F01D 25/005 |
| | | | 415/200 |
| 2016/0326911 A1 | 11/2016 | Karafillis | |
| 2019/0078599 A1* | 3/2019 | Pinney | F02K 1/822 |
| 2019/0264923 A1* | 8/2019 | Kobayashi | F23R 3/002 |
| 2020/0291889 A1* | 9/2020 | Alloway | F01D 25/243 |

* cited by examiner

SYSTEMS AND METHODS FOR ATTACHMENT OF MATERIALS HAVING DIFFERENT THERMAL EXPANSION COEFFICIENTS

GOVERNMENT INTERESTS

This invention was made with government support under FA8650-09-D-2922 awarded by the Department of Defense. The government has certain rights in the invention.

TECHNICAL FIELD

These teachings relate generally to jet engines and, more particularly, to attachment of aircraft engine components that have different thermal expansion coefficients.

BACKGROUND

Turbine engines, and particularly gas or combustion turbine engines, are rotary engines that extract energy from a flow of combusted gases passing through the engine onto a multitude of turbine blades. Exhaust from combustion flows through a high-pressure turbine and a low-pressure turbine prior to leaving the turbine engine through an exhaust nozzle. The exhaust gas mixture passing through the exhaust nozzle is at extremely high temperatures and transfers heat to the components of the turbine engine, including the exhaust nozzle, which is typically metallic. The high temperature environment present within the exhaust nozzle necessitates the use of materials and components that can withstand such an environment.

BRIEF DESCRIPTION OF THE DRAWINGS

Described herein are embodiments of methods of attaching a protective liner to a metal duct of an exhaust nozzle of an aircraft engine. This description includes drawings, wherein.

Elements in the figures are illustrated for simplicity and clarity and have not been drawn to scale. The dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure. Certain actions and/or steps may be described or depicted in a particular order of occurrence while those skilled in the art will understand that such specificity with respect to sequence is not actually required.

The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

As used herein, the terms "first," "second," and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. The approximating language may refer to being within a +/−1, 2, 4, 5, 10, 15, or 20 percent margin in either individual values, range(s) of values, and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Conventional techniques for handling the high temperatures present in and around an aircraft engine include attaching a metal exhaust protective liner directly to a metal exhaust duct using bolts and formed or machined hanger systems. The thermal growth of both metal components is quite similar, which allows both components to be connected using bolts without regard for the differential in their thermal growth characteristics. Other techniques include attaching a ceramic matrix composite (CMC) exhaust liner to the metal exhaust duct, since the CMC is lighter and is capable of withstanding higher temperatures than the typical metallic exhaust liner. Notably, the thermal expansion coefficients of the CMC exhaust liner and the typical metal exhaust duct do not closely match. As such, when exposed to the high temperature environment present in the exhaust nozzle of an aircraft engine, the metal duct expands more than the CMC exhaust liner, which can undesirably lead to stress, displacements, and detachment of portions of the CMC exhaust liner from the metal exhaust duct.

In the aviation industry, there is a desire for components that are made of lighter materials rather than conventional metal materials. Ceramics and their composites such as ceramic matrix composites (CMCs) provide a lightweight material option that is durable at temperatures exceeding competing conventional metals and thus desirable for incorporation into aircraft engines. The ceramic composite materials often need to be combined with and attached to aircraft engine components made of conventional metals. Such metal to non-metal attachments are sometimes used in high temperature environments, for example, an exhaust nozzle of a turbofan aircraft engine.

Since the ceramic composite components and the conventional metals (e.g., titanium or the like) have different thermal expansion coefficients, the present disclosure provides a solution for attaching components of different thermal expansion characteristics to each other for use in a high temperature environment. The solution provides an attachment apparatus that securely attaches a CMC or the like non-metallic liner to a metallic component of an aircraft engine while permitting the components of the attachment apparatus to move/shift relative to one another in order to compensate for the different thermal expansion coefficients of the CMC liner and the metallic component. As such, the embodiments of the attachment apparatus described herein provide an improved and prolonged attachment of the CMC liner to the metal and protect the metal duct from deterioration and/or failing even at the high temperatures present in aircraft engines.

Figure 1:
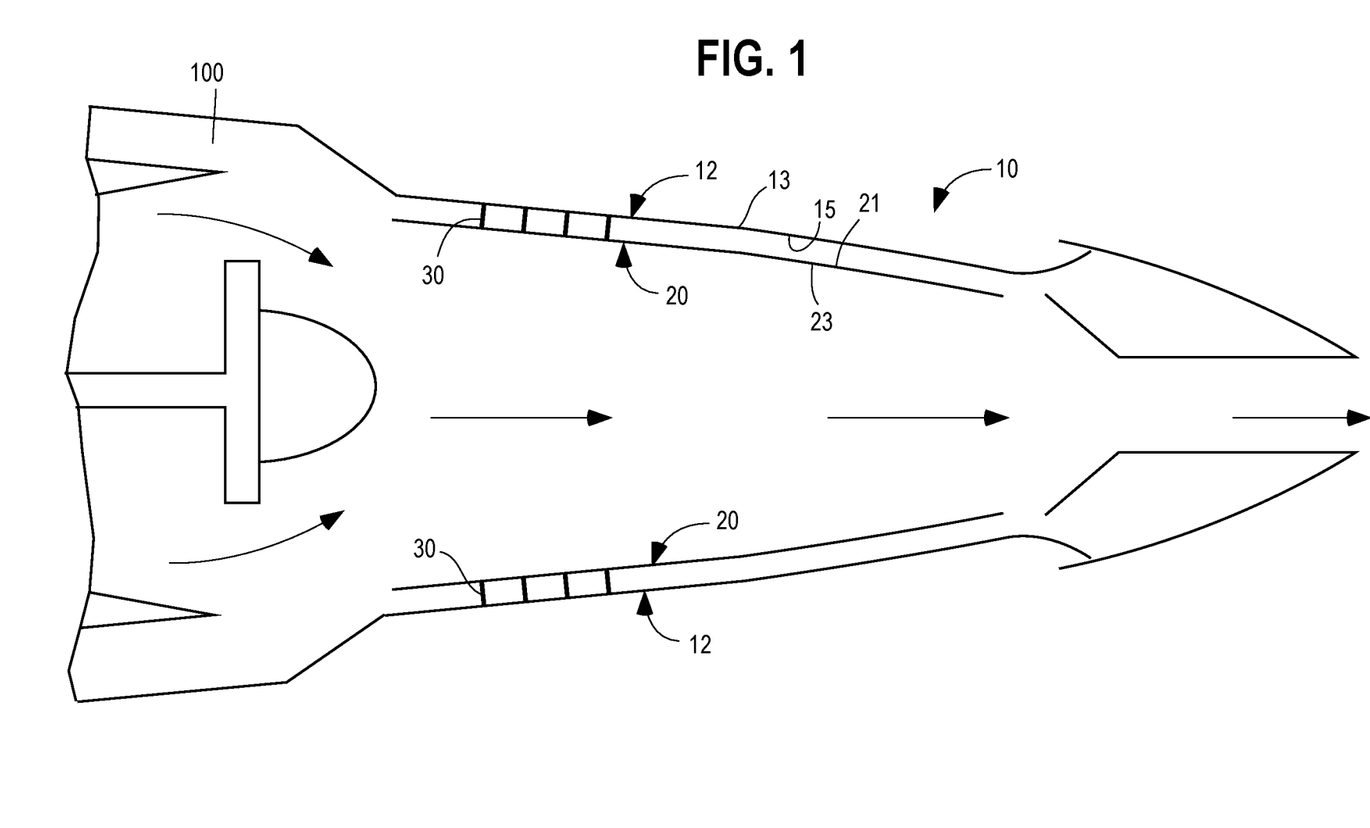
FIG. 1 is a schematic view of an exhaust nozzle of an aircraft engine, where a ceramic composite liner is attached to the metal duct of the exhaust nozzle using multiple attachment (aka hanger) apparatus.
Figure 4:
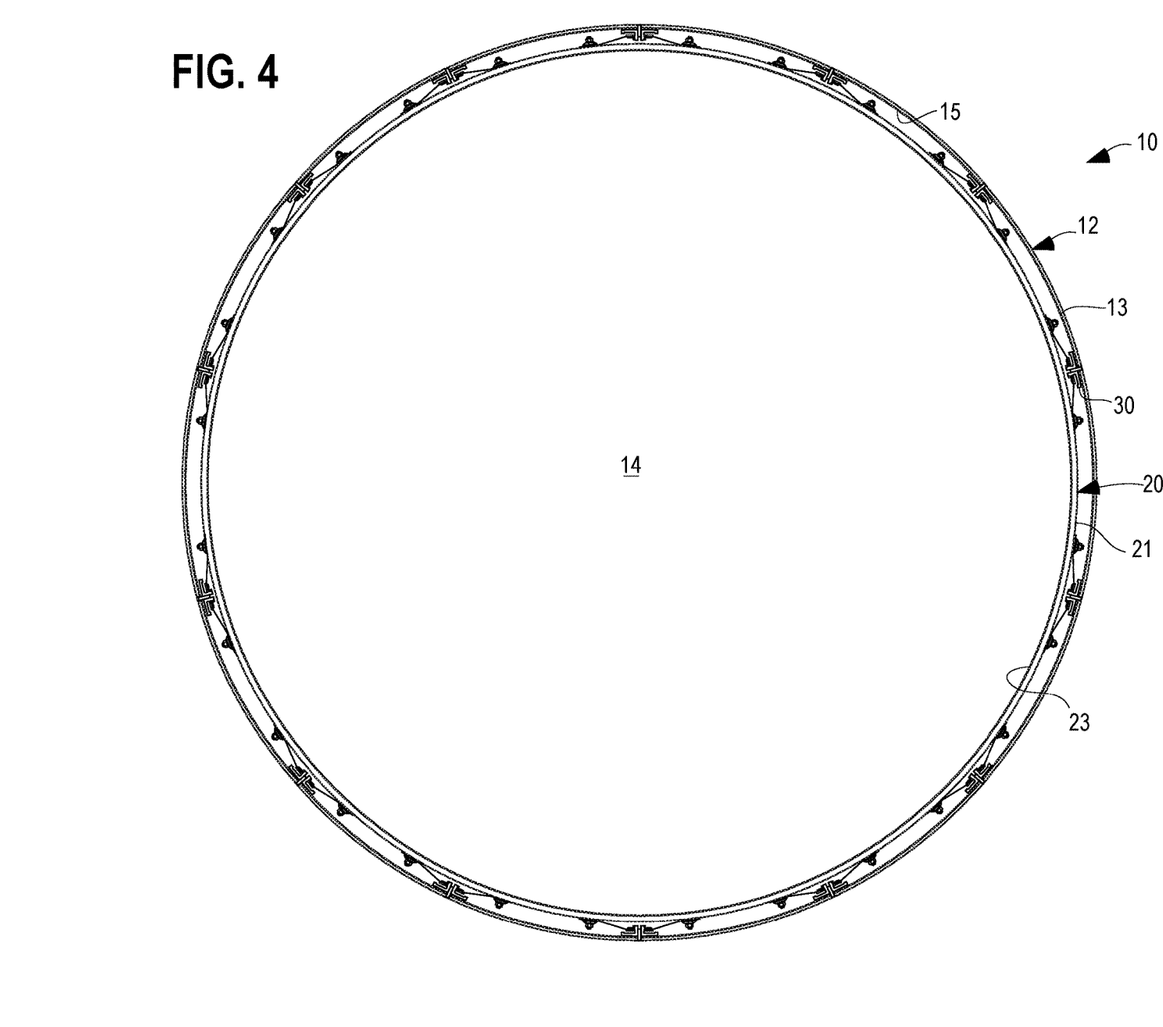
FIG. 4 is an end view from a forward direction of the exhaust nozzle of FIG. 1, showing the attachment of the ceramic composite liner to the metal duct of the exhaust nozzle along the circumference of the exhaust nozzle via a plurality of hanger apparatuses of FIG. 3.

FIG. 1 illustrates an exemplary exhaust nozzle 10 of an aircraft engine 100. The engine 100 may be a jet engine, for example, a turbofan engine. With reference to FIGS. 1 and 4, the exemplary exhaust nozzle 10 has a generally cylindrical shape with a metal duct 12 enclosing an interior 14 of the exhaust nozzle 10. In the embodiment illustrated in FIGS. 1 and 4, a protective CMC liner 20 is attached to an interior-facing surface 15 of the metal duct 12 using a plurality of hanger-like attachment apparatuses 30, exemplary embodiments of which will be described hereinbelow.

Figure 2:
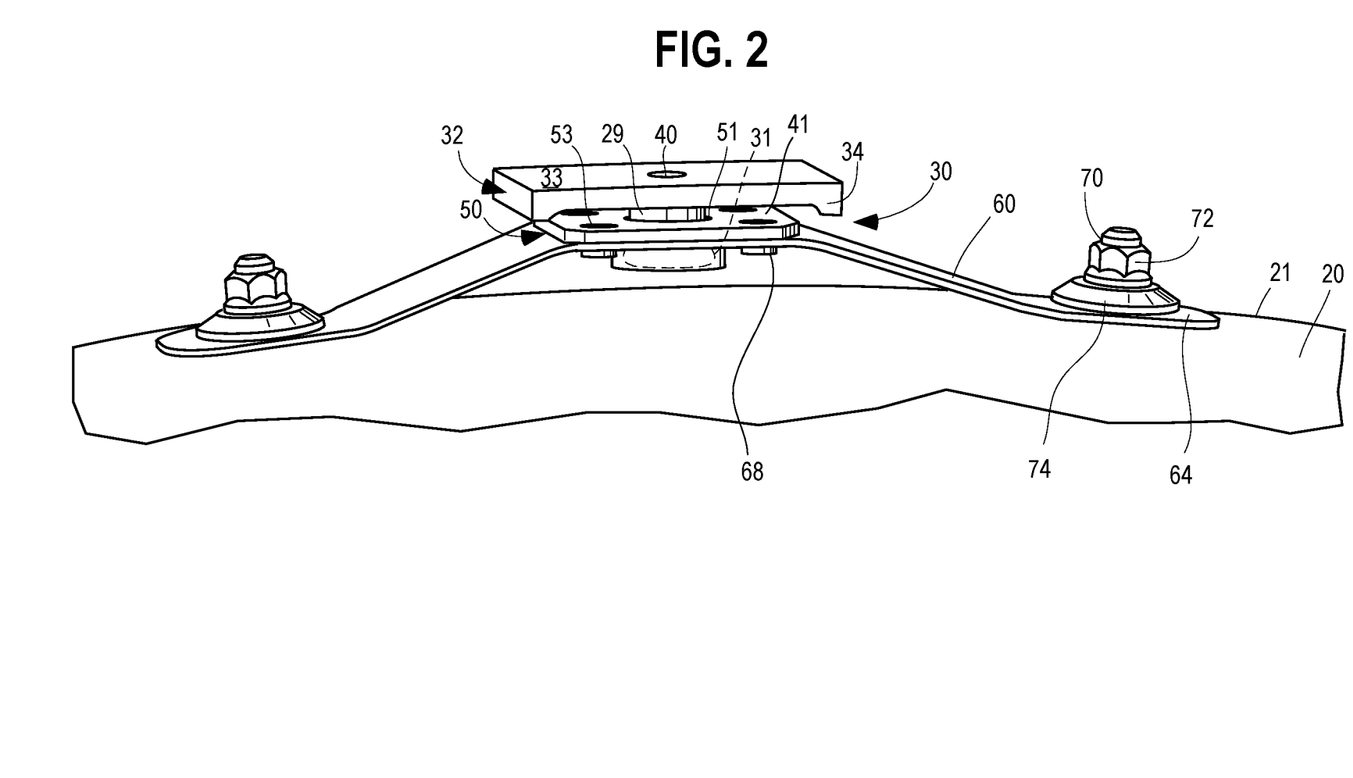
FIG. 2 is a perspective side view of a hanger apparatus that can be utilized in the aircraft engine of FIG. 1.
Figure 3:
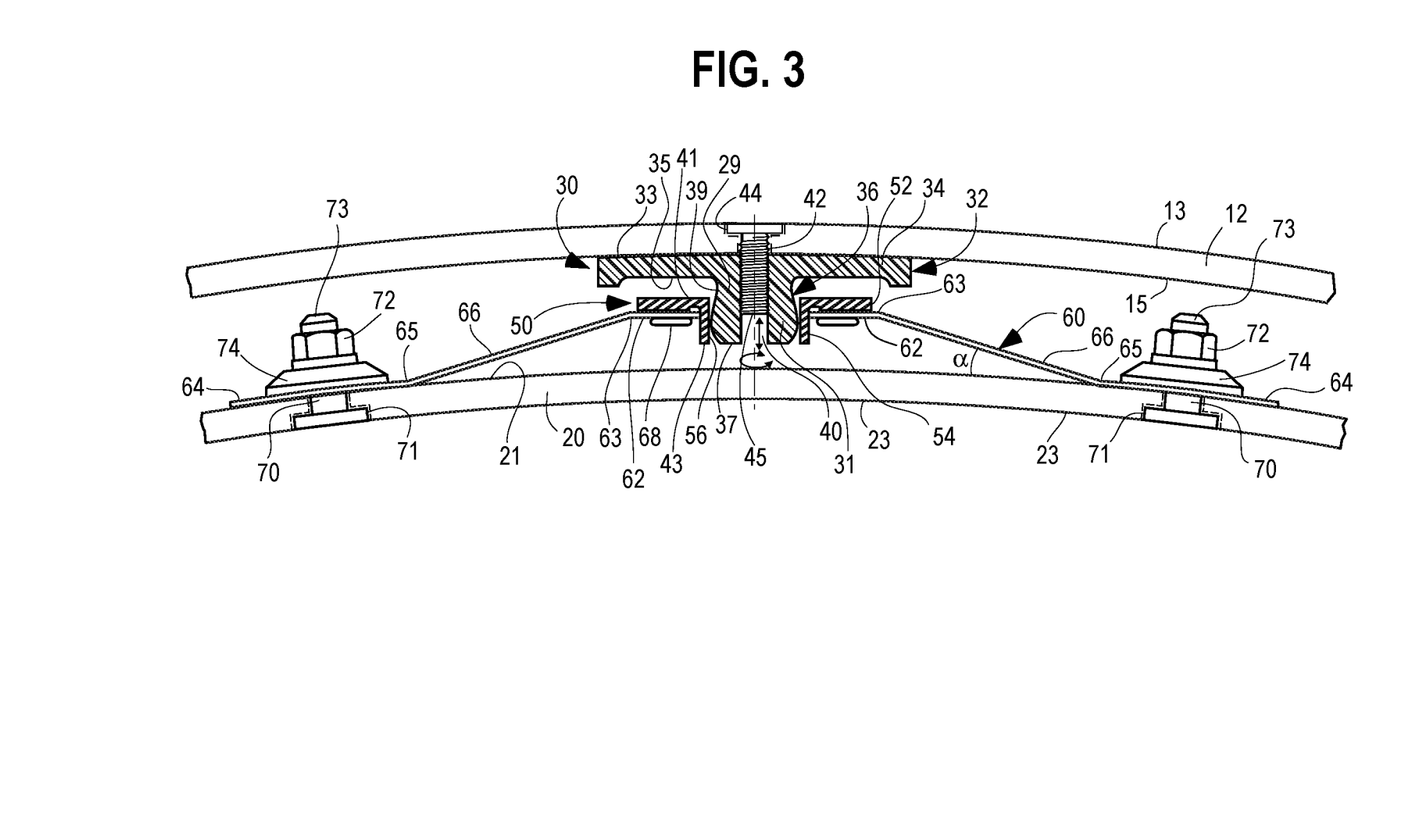
FIG. 3 is a partial cross-section elevational view of the hanger apparatus of FIG. 2, showing the hanger apparatus being fixedly attached to both a portion of the metal duct of the exhaust nozzle and to a portion of the ceramic composite liner.

FIGS. 2-3 illustrate an embodiment of an apparatus 30 (also referred to herein as "an attachment hanger" or just "hanger") for attaching a CMC liner 20 to a metal duct 12 of an exhaust nozzle 10. While reference is being made to attachment of a CMC liner 20 to the metal duct 12 of an exhaust nozzle 10, it will be appreciated that the CMC liner 20 is just an exemplary material that may be used as a protective liner for the metal duct 12 of the exhaust nozzle 10, and that any similar non-metallic material (e.g., polymer matrix composite (PMC) or the like) suitable for lining the interior of the metal duct 12 of the exhaust nozzle 10 by way of having thermal expansion properties suitable for a high temperature environment such as an interior of an exhaust nozzle 10 of an aircraft engine may be used instead. By the same token, while reference is made to attachment of the protective liner 20 to the metal duct 12 of an exhaust nozzle 10 of an aircraft, it will be appreciated that the metal duct 12 of the exhaust nozzle 10 is just an exemplary aircraft component to which the protective liner 20 may be attached via the apparatus 30, and that the apparatus 30 may be used to attach a protective liner to a metal (or metal-like) material of another aircraft engine component and, even more generally, may be used to attach any two components of an aircraft that are made of materials having different coefficients of thermal expansion.

It will be understood that, components of the gas turbine engine such as the liner may comprise a composite material, such as a ceramic matrix composite (CMC) material, which has high temperature capability. As used herein, CMC refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \ 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

In the illustrated embodiment, the attachment apparatus 30 includes a mounting member 32 that includes a body having a plate-like upper portion or first portion 34 and a sphere-like lower portion or second portion 36. The first portion 34 and the second portion 36 can be included in a unitary structure. The first portion 34 of the mounting member 32 has an outwardly-facing surface or first surface 33. In non-limiting examples, the first surface 33 may be at least in part curved to complement the curvature of the interior-facing surface 15 of the duct 12 of the exhaust nozzle 10. The first portion 34 of the mounting member 32 includes an opening 40. In FIG. 3, the opening 40 extends through the first portion 34 of the mounting member 32 and defines apertures in both the first surface 33 of the first portion 34 and the second surface 37 of the first portion 34. In the illustrated example, the opening 40 extends through the distal ends defined by the first portion 34. However, it will be appreciated that, in some embodiments, the opening 40 may not fully extend through the entire height of the first portion 34. The opening 40 may be at least partly threaded to permit a fastener 42 (e.g., a bolt, etc.) to engage a portion thereof and fixedly attach the mounting member 32 to the duct 12, as shown in FIG. 3.

In the embodiment shown in FIG. 3, the mounting member 32 is attached to the duct 12 by the fastener 42 that is at least in part retained within and passes through the duct 12 and through the aperture defined by the opening 40 in the second surface 37 of the first portion 34 of the mounting member 32. As shown in FIG. 3, the head 44 of the fastener 42 may be received in the duct 12 such that the head 44 is recessed in a portion of the duct 12 of the exhaust nozzle 10. In this exemplary manner, no portion of the head 44 of the fastener 42 protrudes above an exterior surface 13 of the duct 12. In addition, FIG. 3 shows that the distal end 45 of the fastener 42 may be located within the opening 40 without protruding through the second surface 37 of the first portion 34 of the mounting member 32. It will be appreciated, that, in some embodiments, the distal end 45 of the fastener 42 may pass through the entire height of the opening 40 and protrude beyond the second surface 37 of the first portion 34 of the mounting member 32.

In the non-limiting illustrated example, the second portion 36 of the mounting member 32 has a first portion 29 and a second portion 31 that includes an arcuate, generally spherical, exterior surface or first surface 39 that is sized and shaped for insertion into a cylindrical socket provided by an attachment member 50 of the attachment apparatus 30, which will be described in more detail below.

With reference to FIGS. 2-3, the attachment member 50 of the attachment apparatus 30 may be a bushing or the like that is fixedly attached to the protective liner 20. Further still, the mounting member 32 may be received within the attachment member 50 such that the mounting member 32 is permitted both radial and rotational freedom of movement relative to the attachment member 50, as indicated by directional arrows in FIG. 6. In the illustrated embodiment, the attachment member 50 includes a plate-like portion 52 and a tubular portion 54. It will be understood that the plate-like portion 52 need not be entirely flat. The tubular portion 54 of the attachment member 50 has a generally cylindrical interior surface 56 that defines a socket (with generally straight sides as shown in FIG. 3) sized and shaped to receive the generally spherical second portion 36 of the mounting member 32.

Figure 6:
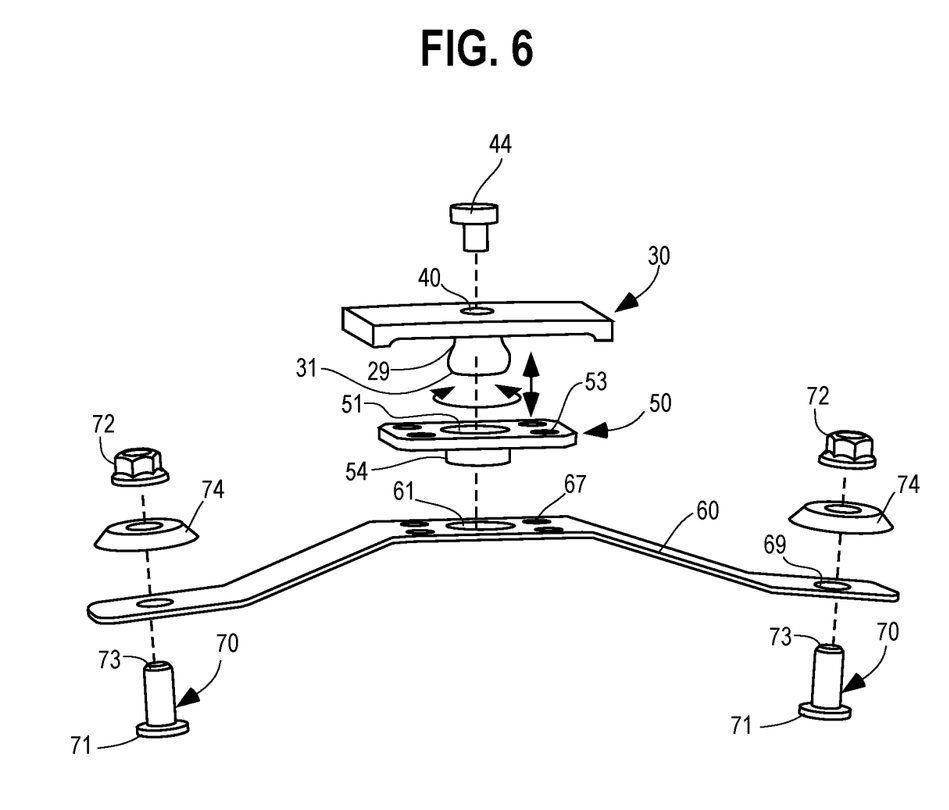
FIG. 6 is a perspective exploded view of the hanger apparatus of FIGS. 2-3.

As can be seen with reference to FIGS. 2, 3, and 6, the plate-like portion 52 includes a first or outwardly-facing surface 41 and an opening 51 therein that permits the first portion 29 of the second portion 36 of the mounting member 32 to pass therethrough while not permitting the second portion 31 of the second portion 36 of the mounting member 32 to pass therethrough. In other words, in the illustrated embodiment, the first portion 29 of the second portion 36 of the mounting member 32 has a diameter than is smaller than a diameter of the opening 51, while the second portion 31 of the second portion 36 of the mounting member 32 has a diameter that is larger than the diameter of the opening 51, such that the second portion 31 of the second portion 36 is permitted radial and rotational movement (as indicated by the directional arrows in FIG. 6) within the socket, but restricted from moving through the opening 51 and out of the socket formed by the cylindrical interior surface 56 of the tubular portion 54 of the attachment member 50. The inwardly-facing or second surface 37 of the second or spherical portion 31 of the mounting member 32 and an inwardly-facing surface 43 of the tubular portion 54 of the attachment member 50 may be aligned to be planar relative to each other, as shown in the embodiment of FIG. 3.

As shown in FIG. 2, when the second portion 36 of the mounting member 32 is positioned in the socket defined by the interior surface 56 of the tubular portion 54 of the attachment member 50, the first surface 39 of the second portion 36 of the mounting member 32 engages the interior surface 56 of the attachment member 50 such that the second portion 36 of the mounting member 32 is permitted to move with multiple degrees of freedom while in the socket, namely, rotationally in any direction and radially inwardly/outwardly relative to the interior surface 56 of the attachment member 50, the duct 12 and the protective liner 20. In other words, the coupling/engagement of the second portion 36 of the mounting member 32 and the tubular portion 54 of the attachment member 50 enables both radial and rotational freedom of movement of the mounting member 32 relative to the attachment member 50.

In particular, when the protective liner 20 is attached to the duct 12 via the attachment apparatus 30, the freedom of movement of the mounting member 32 relative to the attachment member 50 advantageously accommodates for possible thermal expansion of the duct 12 and/or the protective liner 20. In some embodiments, the attachment apparatus 30 may provide for axial and tangential restraint, while allowing radial and rotational freedom between the protective liner 20 and the duct 12. In certain aspects, the radial freedom of movement of the mounting member 32 relative to the attachment member 50 provides protection to the protective liner 20 against being overstressed during possible thermal expansion. In some aspects, the space created by the attachment apparatus 30 between the duct 12 and the protective liner 20 liner may advantageously provide a passage for the flow of cooling air.

The plate-like portion 52 of the attachment member 50 includes a plurality of apertures 53 (see FIGS. 2 and 6) that facilitate the attachment of the attachment member 50 to a leg member 60 that is attached to the protective liner 20. To that end, the exemplary attachment apparatus 30 illustrated in FIGS. 2 and 3 includes a leg member 60 (which may be a unitary structure or formed as two separate pieces) having a first foot portion 62 attached to the attachment member 50, a second foot portion 64 attached to the protective liner 20, and a leg portion 66 interconnecting the first and second foot portions 62, 64. As can be seen with reference to FIGS. 3 and 6, the attachment member 54 is coupled to the leg member 60 such that the tubular portion 54 of the attachment member 50 passes through an opening 61 in the leg member 60 (by virtue of the tubular portion 54 having a diameter that is smaller than a diameter of the opening 61).

In the embodiment shown in FIG. 2, each of the first foot portions 62 of the leg member 60 is attached to the attachment member 50 via two rivets 68 (passing through the openings 53 of the attachment member 50 and the openings 67 in the leg member 60, as seen in FIG. 6), such that four rivets 68 are used to secure the leg member 60 to the attachment member 50. It will be appreciated that fasteners other than rivets 68, for example, screws, bolts, etc. may be used instead. It will also be appreciated that the number of rivets 68 (i.e., 4) used in FIG. 2 Is just exemplary, and that less than 4 (e.g., 2) or more than 4 (e.g., 6) rivets 68 may be used instead. In addition, in some embodiments, the attachment member 50 may be formed integrally with the leg member 60 such that attachment of the leg member 60 to the attachment member 50 via fasteners such as rivets 68 would not be needed. In the illustrated embodiment, each of the rivets 68 passes through a respective aperture 53 in the plate-like portion 52 of the attachment member 50 and through one or more complementary apertures in the first foot portions 62 of the leg member 60, and is secured in place using conventional means.

On the other hand, the second foot portions 64 of the leg member 60 are attached to the outwardly-facing surface 21 of the protective liner 20 via bolts 70 (it will be appreciated that fasteners other than bolts may be used instead). In the embodiment illustrated in FIGS. 2-3, each of the bolts 70 passes through a portion of the protective liner 20 and passes through an opening 69 in the second foot portion 64 of the leg member 60 and extends above the outwardly-facing surface 21 of the protective liner 20, being secured relative to the outwardly-facing surface 21 of the protective liner 20 via a nut 72 (e.g., a self-locking nut), with a distal end 73 of the bolt 70 passing through the nut 72, as shown in FIG. 3.

As shown in FIGS. 2-3, the nut 72 may be tied onto a thermal spacer 74 (through which the threaded portion of the bolt 70 passes), which accommodates for possible thermal expansion of the protective liner 20 and/or the bolt 70, keeping the attachment of the leg member 60 to the protective liner 20 secure. Generally, the thermal spacer 74 may be made from alloys specifically selected to have a relatively high coefficient of thermal expansion to make up for the relatively low thermal expansion coefficient of the protective liner 20. In addition, the head 71 of the bolt 70 is recessed in the protective liner 20 such that no portion of the head 71 of the bolt 70 protrudes below the interior-facing surface 23 of the protective liner 20, advantageously not exposing the metallic head 71 to the high temperature gases passing through the interior 14 of the exhaust nozzle 10, and thereby protecting the head 71 from direct impingement of hot exhaust gases.

With reference to FIG. 3, each of the foot portions 66 of the leg member 60 has a first bend 63 between the first foot portion 62 and the leg portion 66 and a second bend 65 between the leg portion 66 and the second foot portion 64. This configuration of the leg member 60 facilitates the mounting of the attachment apparatus 30 onto a curved surface, such as the outwardly-facing surface 21 of the protective liner 20, also enabling the attachment apparatus 30 to flex toward or away from the outwardly-facing surface 21 of the protective liner 20 (e.g., to accommodate for possible thermal expansion of the protective liner 20). In the illustrated embodiment, the leg portion 66 extending between the first foot portion 62 and the second foot portion 64 is angled such that the leg portion 66 forms an acute interior angle α relative to the outwardly-facing surface 21 of the of the protective liner 20. Generally speaking, given that the a CMC-based protective liner 20 would not be as strong as metallic materials in the through-thickness direction, minimizing the interior angle α of the leg portion 66 relative to the outwardly-facing surface 21 of the protective liner 20 such that the leg portion 66 is as near tangential as possible aids in load transfer in the in-plane, strong direction of the protective liner 20.

FIG. 4 shows a duct 12 having the protective liner 20 attached along the full circumference of the duct 12 via a plurality of the above-described attachment apparatuses or attachment hangers 30. The attachment hangers 30 are arranged circumferentially in series around the protective liner 20 and are located between the protective liner 20 and the duct 12. When arranged substantially as shown in FIG. 4, the attachment hangers 30 effectively attach the protective liner 20 to the duct 12 and provide long-term protection to the duct 12, while accommodating for the differences in thermal expansion coefficients between the protective liner 20 and the duct 12 by permitting movement of the protective liner 20 and the duct 12 relative to each other (by way of the freedom-of-movement between the mounting member 32 and the attachment member 50 as described above).

As can be seen in FIG. 4, the attachment hangers 30 are positioned such that there is space between adjacent attachment hangers 30. The space between the adjacent attachment hangers 30 may be approximately equal to a full length of a single attachment hanger 30 (i.e., another attachment hanger 30 may fit in the space between the adjacent attachment hangers 30). However, it will be appreciated that the space between the adjacent attachment hangers 30 in FIG. 4 is exemplary and not necessarily to scale. In the embodiment illustrated in FIG. 4, fourteen attachment hangers 30 are used to fixedly attach the protective liner 20 to the duct 12 (which, as pointed out above, may be a metal duct of an exhaust nozzle 10 of an aircraft engine, but which also may be a metallic or metal-like material of another component of an aircraft), but it will be appreciated that, depending on the diameter of the exhaust nozzle 10 of a particular aircraft engine, and depending on the thermal expansion coefficient of a particular protective liner 20 used to line the interior-facing surface 15 of the duct 12 of the exhaust nozzle 10, less than fourteen or more than fourteen attachment hangers 30 may be used.

Figure 5:
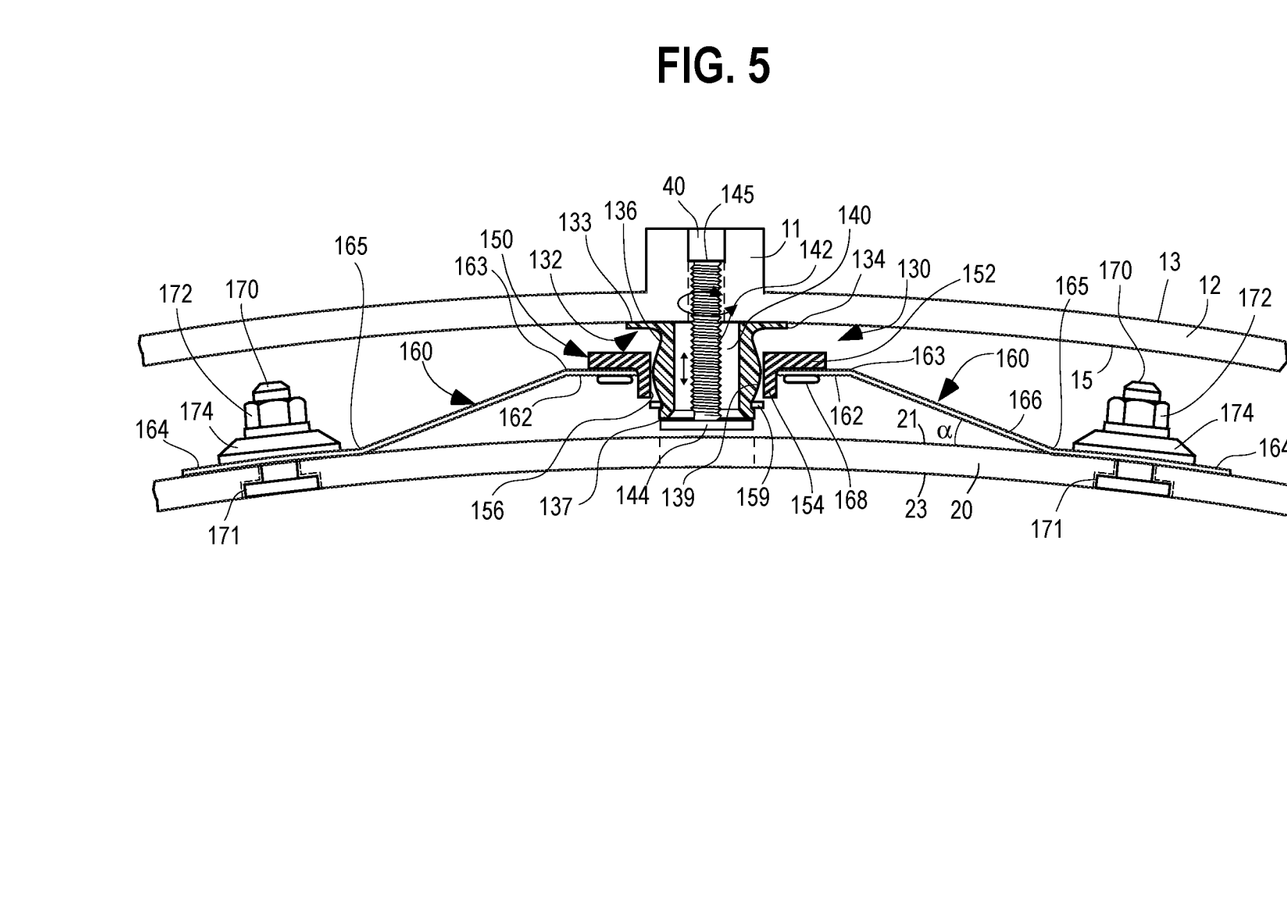
FIG. 5 is a partial cross-section elevational view of another exemplary hanger apparatus that can be utilized in the aircraft engine of FIG. 1, showing the hanger apparatus being fixedly attached to both a portion of the metal duct of the exhaust nozzle and to a portion of the ceramic composite liner.

FIG. 5 illustrates another embodiment of an attachment apparatus 130 (also referred to herein as "an attachment hanger" or simply "hanger") for attaching a protective liner 20 to a duct 12. The attachment apparatus 130 is configured for attaching a protective liner 20 (e.g., a CMC liner, PMC liner, or the like) to a metallic or metal-like material (e.g., an aircraft engine exhaust nozzle metal duct, another aircraft engine component, or another aircraft component, or the like) and has an overall construction that is generally similar to that of the attachment apparatus 30 described above, with some differences highlighted below. For ease of reference, aspects of the attachment apparatus 130 that are similar to aspects of the attachment apparatus 30 described above with reference to FIGS. 2-4 have been designated in FIG. 5 with similar reference numbers, but prefaced with a "1."

In the illustrated embodiment, the attachment apparatus 130 includes a mounting member 132 that includes a body having an upper portion or first portion 134 and a lower portion or second portion 136. The first portion 134 and the second portion 136 can be included in a unitary structure. In non-limiting examples, the first portion 134 of the mounting member 132 has an outwardly-facing or first surface 133 that may be at least in part curved to complement the curvature of the interior-facing surface 15 of the duct 12. The first portion 134 of the mounting member 132 includes an opening 140 that may be threaded to permit a fastener 142 (e.g., a bolt, etc.) passing through at least a portion of the duct 12 to also pass through at least a portion of the threaded opening 40 and fixedly attach the mounting member 132 to the duct 12, as shown in FIG. 5.

In the attachment apparatus 30 described above (see FIG. 3), the mounting member 32 is attached to the duct 12 by a fastener 42 that passes through the duct 12 and through the opening 40 in the first surface 33 of the first portion 34 of the mounting member 32, such that the head 44 of the fastener 42 is recessed in the duct 12 (and no portion of the head 44 of the fastener 42 protrudes above an exterior surface 13 of the duct 12), and such that the distal end 45 of the fastener 42 is located within the opening 40 and does not protrude beyond the opening 40 in the second surface 37 of the first portion 34 of the mounting member 32.

Conversely, in the embodiment of the attachment apparatus 130 shown in FIG. 5, the mounting member 132 is attached to the duct 12 by a fastener 142 that passes through an opening 140 in the inwardly-facing or second surface 137 of the first portion 134 of the mounting member 132 and passes through a portion of the duct 12, such that the distal end 145 of the fastener 142 extends above the outwardly-facing surface 13 of the duct 12, such that the head 144 of the fastener 142 is located between the second surface 137 and the outwardly-facing surface 21 of the protective liner 20, and such that the shaft of the fastener 142 is located within the opening 40 and within the duct 12. It will be appreciated that the second surface 137 of the first portion 134 of the mounting member 132 may be configured such that the head 144 of the fastener 142 does not protrude below the second surface 137, but is instead recessed in the second surface 137, such that no portion of the head 144 of the fastener 142 protrudes below the second surface 137. In some embodiments, the thickness of the duct 12 may be increased (e.g., via an embossing 11 or the like) in the area where the fastener 142 passes through the duct 12 to provide a larger area of contact between the shaft of the fastener 142 and the through-thickness of the duct 12 (see FIG. 5), and thereby provide a more secure attachment of the first portion 134 of the attachment hanger 130 to the duct 12. In one aspect, the embossing 11 may include a threaded insert complementary to the shaft of the fastener 142.

The second portion 136 of the mounting member 132 is generally cylindrical in shape and includes an arcuate, generally spherical, exterior or first surface 139 sized and shaped for insertion into a cylindrical socket provided by an attachment member 150 of the attachment hanger 130. The attachment member 150 of the attachment hanger 130 may be a bushing or the like that is fixedly attached to the protective liner 20 and that is coupled to the mounting member 132 such that the second portion 136 of the mounting member 132 is permitted to move with multiple degrees of freedom while in the socket, namely, rotationally in any direction and radially inwardly/outwardly relative to the attachment member 150, the duct 12 and the protective liner 20. In the illustrated embodiment, the attachment member 150 includes a plate-like portion 152 and a tubular portion 154. The tubular portion 154 of the attachment member 150 has a generally cylindrical interior surface 156 that defines a generally cylindrical socket (with generally straight sides as shown in FIG. 5) sized/shaped to receive the second portion 136 of the mounting member 132 and permit the second portion 136 of the mounting member to move (e.g., due to thermal expansion of the CMC liner 20) relative to the tubular portion 154 of the attachment member 150 with multiple degrees of freedom both radially and rotationally as described above.

As shown in FIG. 5, when the second portion 136 of the mounting member 132 is positioned in the socket defined by the interior surface 156 of the tubular portion 154 of the attachment member 150, the first surface 139 of the second portion 136 of the mounting member 132 engages the interior surface 156 of the attachment member 150 and is permitted to move radially inwardly/outwardly and rotationally in any direction relative to the interior surface 156 of the attachment member 150. In other words, the coupling/engagement of the second portion 136 of the mounting member 132 and the tubular portion 154 of the attachment member 150 enables both radial and rotational freedom of movement of the mounting member 132 relative to the attachment member 150. FIG. 5 shows that a snap ring retainer 159 may be fitted over the second portion 136 of the mounting member 132 to accommodate for possible thermal expansion and/or movement of the mounting member 132 relative to the attachment member 150 by restricting the outwardly movement of the second portion 136 of the mounting member 132, and preventing the engagement of the mounting member 132 to the attachment member 150 from becoming undesirably loose, while also facilitating the ease of assembly of the attachment apparatus 130.

In particular, when the protective liner 20 is attached to the duct 12 via the attachment apparatus 130, the freedom of movement of the mounting member 132 relative to the attachment member 150 advantageously accommodates for possible thermal expansion of the duct 12 and/or the protective liner 20. In certain aspects, the radial freedom of movement of the mounting member 132 relative to the attachment member 150 provides protection to the protective liner 20 against being overstressed during possible thermal expansion. In some embodiments, the attachment apparatus 130 may provide for axial and tangential restraint, while allowing radial and rotational freedom between the protective liner 120 and the duct 12. In some aspects, the space created by the attachment apparatus 30 between the duct 12 and the protective liner 20 liner may advantageously provide a passage for the flow of cooling air.

Similarly to the attachment member 50 illustrated in FIG. 3, the plate-like portion 152 of the attachment member 150 includes a plurality of apertures 153 (not visible in FIG. 5) that facilitate the attachment of the attachment member 150 to leg member 160 which is in turn attached to the protective liner 20. To that end, like the attachment member 50, the exemplary attachment member 150 illustrated in FIG. 5 includes leg member 160 having a first foot portion 162 attached to the attachment member 150, a second foot portion 164 attached to the protective liner 20, and a leg portion 166 interconnecting the first and second foot portions 162, 164.

In the embodiment shown in FIG. 5, each of the first foot portions 162 of the leg member 160 is attached to the attachment member 150 via two rivets 168, such that four rivets 168 are used to secure the leg members 160 to the attachment member 150 (as pointed out above, it will be appreciated that more than 4 and less than 4 rivets 168 may be used to attach the foot portions 162 of the leg member 160 to the attachment member 150, and that fasteners other than rivets 168, for example, screws, bolts, etc. may be used instead). In some embodiments, the attachment member 150 may be formed integrally with the leg member 160 such that attachment of the leg member 160 to the attachment member 150 via fasteners such as rivets 168 would not be needed. The second foot portions 164 of the leg member 160 are attached to the outwardly-facing surface 21 of the protective liner 20 via bolts 170 (it will be appreciated that fasteners other than bolts may be used instead). In the embodiment shown in FIG. 5, each of the bolts 170 passes through a portion of the protective liner 20 and passes through an opening in the second foot portion 164 of the leg member 160 and extends above the outwardly-facing surface 21 of the protective liner 20, being secured relative to the outwardly-facing surface 21 of the protective liner 20 via a nut 172 (e.g., a self-locking nut).

As shown in FIG. 5 the nut 172 may be tied onto a thermal spacer 174 (through which the threaded portion of the bolt 170 passes), which is made of a material having a higher thermal expansion coefficient than the protective liner 20 and accommodates for possible thermal expansion of the protective liner 20 and/or the bolt 170, keeping the attachment of the leg member 160 to the protective liner 20 even more secure. In addition, as can be seen in FIG. 5, the head 171 of the bolt 170 may be recessed in the protective liner 20 such that no portion of the head 171 of the bolt 170 protrudes below the interior-facing surface 23 of the protective liner 20, advantageously not exposing the metallic head 171 of the bolt 170 to the high temperature gases passing through the interior 14 of the exhaust nozzle 10, and thereby protecting the head 171 from direct impingement of hot exhaust gases.

Similarly to the leg member 60 shown in FIG. 3, the leg member 160 shown in FIG. 5 has a first bend 163 between the first foot portion 162 and the leg portion 166 and a second bend 165 between the leg portion 166 and the second foot portion 164. This configuration of the leg member 160 facilitates the mounting of the attachment apparatus 130 onto a curved surface, such as the outwardly-facing surface 21 of the protective liner 20, as well as enables the attachment apparatus 130 to flex toward or away from the outwardly-facing surface 21 (e.g., to accommodate for possible thermal expansion of the protective liner 20).

In the illustrated embodiment, the leg portion 166 extending between the first foot portion 162 and the second foot portion 164 is angled such that the leg portion 166 forms an acute interior angle α relative to the outwardly-facing surface 21 of the of the protective liner 20. As pointed out above with reference to the leg portions 66, since the protective liner 20 is not as strong as metals in the through-thickness direction, minimizing the interior angle of the leg portion 166 relative to the outwardly-facing surface 21 of the protective liner 20 such that the leg portion 166 is as near tangential as possible aids in load transfer in the in-plane, strong direction of the protective liner 20.

Figure 7:
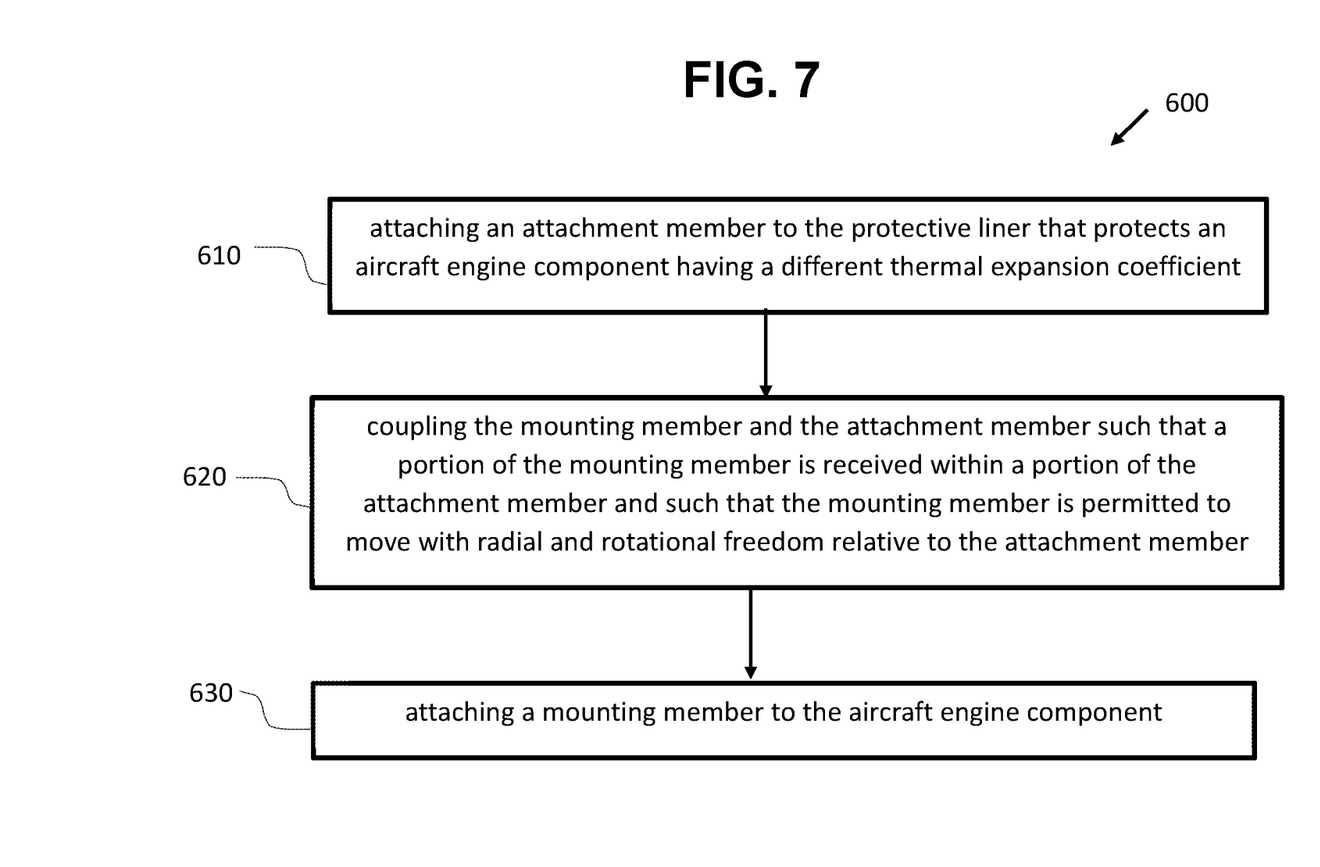
FIG. 7 is a flow chart diagram of a process of attaching a protective liner to a metal duct of an exhaust nozzle of an aircraft engine.

With reference to FIG. 7, an exemplary method 600 of attaching a protective liner 20 (e.g., a CMC liner, PMC liner, or the like) to a duct 12 (e.g., a metallic or metal-like duct of an exhaust nozzle 10 of an aircraft engine, a metallic or metal-like component of an aircraft engine, or a metallic or metal-like component of an aircraft) will now be described.

For exemplary purposes, the method 600 is described in the context of attaching the attachment hanger 30 described with reference to FIGS. 2-4 to a protective liner 20 and to the duct 12 thereby attaching the protective liner 20 to the duct 12, but it will be understood that embodiments of the method 600 may be implemented to attach various embodiments of the attachment hanger 130 to the duct 12 and the protective liner 20.

The method 600 includes attaching an attachment member 50 to the protective liner 20 (step 610). As described in more detail above, in some embodiments, the attachment member 50 may be fixedly attached to the protective liner 20 via one or more fasteners 70 (e.g., bolts or the like) that pass through the protective liner 20 and through an opening 69 in the second foot portions 64 of the leg member 60 of the attachment hanger 30. As shown in FIGS. 3 and 5, each of the fasteners 70 may be secured to the respective second foot portion 64 of the leg member 60 via a nut 72, with a thermal spacer 74 being positioned between the nut 72 and the second foot portion 64 to accommodate for possible thermal expansion of the protective liner 20 and/or parts of the attachment hanger 30. In addition, as shown in FIGS. 2 and 5, the first foot portions 62 of the leg member 60 of the attachment hanger 30 may be attached to the attachment member 50 of the attachment hanger 30 via rivets 68 (or screws, bolts, or the like), and the rivets 68 may be secured in place using conventional means.

The method 600 further includes engaging/coupling the mounting member 32 and the attachment member 50 such that a portion of the mounting member 32 is received (e.g., in frictional contact) in a portion of the attachment member 50, and such that the mounting member 32 is permitted freedom of movement (e.g., radial freedom of movement, translational freedom of movement, rotational freedom of movement (see FIG. 6)) relative to the attachment member 50 (step 620). For example, as described above, the second portion 36 of the mounting member 32 may be positioned in the socket defined by the interior surface 56 of the tubular portion 54 of the attachment member 50 such that the first surface 39 of the second portion 36 of the mounting member 32 engages the interior surface 56 of the attachment member 50 and is permitted to move both radially relative to the interior surface 56 of the attachment member 50, thereby providing protection to the protective liner 20 against being overstressed during possible thermal expansion.

In the illustrated embodiment, the method 600 further includes attaching the mounting member 32 to the duct 12 (step 630). As described in more detail above, the mounting member 32 may be fixedly attached to the duct 12 via one or more fasteners 42 (e.g., bolts or the like) that pass through the duct 12 and pass through a portion (e.g., a threaded opening 40) of the mounting member 32.

Without wishing to be limited to theory, the embodiments of the attachment apparatus 30, 130 described herein provide axial and tangential restraint while allowing the protective liner 20 to thermally grow independently of the duct 12 which the protective liner 20 protects, accommodating both for thermal expansion of the protective liner 20 and for possible manufacturing out-of-roundness. Since a protective liner 20 is significantly stronger in-plane than it is through the thickness thereof, the attachment hangers 30, 130 described herein maximize in-plane loading while limiting the out-of-plane component. Additionally, a CMC, PMC, or the like protective liner is lower in weight as compared to a similar metallic liner and decreases the weight of the engine while increasing engine performance and range. In addition, the protective liners attached by the attachment hangers described herein would likely have a longer service life over comparable metal liners, providing a benefit to the propulsion system life cycle cost.

Further aspects of the disclosure are provided by the subject matter of the following clauses:

There is provided an apparatus for attaching a protective liner to a an aircraft engine component, wherein the protective liner and the aircraft engine component have different coefficients of thermal expansion. The apparatus includes: a mounting member configured to be attached to the aircraft engine component; and an attachment member configured to be attached to the protective liner. The mounting member and the attachment member are coupled to each other such that a portion of the mounting member is received within a portion of the attachment member, and such that the mounting member is permitted to move with both radial and rotational freedom relative to the attachment member.

The mounting member may include an opening, and the apparatus may include a fastener configured to pass through a portion of the opening and attach the mounting member to the aircraft engine component. The head of the fastener may be recessed in the aircraft engine component such that no portion of the head of the fastener protrudes above an exterior surface of the aircraft engine component. The head of the fastener may be located between an inwardly-facing surface of the mounting member and the aircraft engine component, and a shaft of the fastener may extend through the aircraft engine component and partly extends above an exterior surface of the aircraft engine component.

The apparatus may further include at least one leg member having a first foot portion and a second foot portion opposite the first foot portion, the first foot portion being attached to the attachment member and the second foot portion being attached to the protective liner. The first foot portion of the at least one leg member may include a first through opening and is attached to the attachment member via at least one rivet, and the second foot portion of the at least one leg member may include a second through opening and is attached to the protective liner via a bolt. The apparatus may further include at least one thermal spacer positioned between the second foot portion of the at least one leg member and a nut coupled to a threaded portion of the bolt. The head of the bolt may be recessed in the protective liner such that no portion of the head of the bolt protrudes below an interior surface of the protective liner.

The mounting member may include a plate-like portion and a spherical portion extending from the plate-like portion, and the attachment member may include a plate-like portion and a tubular portion extending from the plate-like portion of the attachment member. The plate-like portion of the mounting member may include an outwardly-facing surface in contact with the metallic-component and an inwardly-facing surface opposite the outwardly-facing surface, and the spherical portion of the mounting member may include an inwardly-facing surface that is spaced from an outwardly-facing surface of the protective liner.

The plate-like portion of the attachment member may include an outwardly-facing surface that is separated by a gap from the inwardly-facing surface of the plate-like portion of the mounting member, and the tubular portion of the attachment member may include an inwardly-facing surface that is spaced from an outwardly-facing surface of the protective liner.

The inwardly-facing surface of the spherical portion of the mounting member and the inwardly-facing surface of the tubular portion of the attachment member may be aligned to be planar relative to each other. The spherical portion of the mounting member may include an arcuate exterior-facing surface and the tubular portion of the attachment member may include a straight interior-facing surface that defines a socket that receives the exterior-facing arcuate surface of the mounting member.

In some aspects, the socket may permit the exterior-facing surface of the mounting member to move relative to the interior-facing surface of the attachment member radially outwardly in a direction toward the aircraft engine component and radially inwardly in a direction toward the protective liner. In some aspects, the socket may permit the exterior-facing surface of the mounting member to rotate about a central longitudinal axis of the mounting member, the central longitudinal axis of the mounting member being generally perpendicular to the outwardly-facing surface of the plate-like member of the mounting member and the inwardly-facing surface of the spherical portion of the mounting member In certain implementations, the spherical portion of the mounting member may include a first portion and a second portion, the diameter of the second portion of the spherical portion of the mounting member being greater than a diameter of the first portion of the spherical portion of the mounting member. In some aspects, the plate-like portion of the attachment member may include an opening that has a diameter that is greater than the diameter of the first portion of the spherical portion of the mounting member and that permits the first portion of the spherical portion of the mounting member to pass through the opening in the plate-like portion of the attachment member and to move radially and rotationally within the opening in the plate-like portion of the attachment member. The diameter of the opening in the plate-like portion of the attachment member may be smaller than the diameter of the second portion of the spherical portion of the mounting member to restrict the second portion of the spherical portion of the mounting member from exiting from the socket by passing through the opening in the plate-like portion of the attachment member.

There is also provided a system for attaching a protective liner to a an aircraft engine component, wherein the protective liner and the aircraft engine component have different coefficients of thermal expansion. The system includes: a mounting member including a threaded opening; a fastener that passes through the aircraft engine component and through the threaded opening in engagement with the mounting member and attaches the mounting member to the aircraft engine component. A portion of a shaft of the fastener is retained in the aircraft engine component, and wherein a head of the fastener is retained in the aircraft engine component or extends outwardly relative to an outwardly-facing surface of the aircraft engine component; The system further includes an attachment member configured to be attached to the protective liner via at least one leg member having a first foot portion and a second foot portion opposite the first foot portion, the first foot portion being attached to the attachment member via at least a first fastener and the second foot portion being attached to the protective liner via at least a second fastener. The mounting member includes a spherical portion including an arcuate exterior-facing surface and the attachment member includes a tubular portion including an interior-facing surface that defines a socket that receives the exterior-facing surface of the mounting member and permits the exterior-facing surface of the mounting member to move relative to the attachment member with both radial and rotational freedom within the socket defined by the interior-facing surface of the attachment member.

There is also provided a system for attaching a protective liner to a an aircraft engine component, wherein the protective liner and the aircraft engine component have different coefficients of thermal expansion. The system includes a mounting member including a threaded opening; a fastener that passes through the aircraft engine component and through the threaded opening in engagement with the mounting member and attaches the mounting member to the metallic component, wherein a portion of a shaft of the fastener is retained within the aircraft engine component, and wherein a head of the fastener is located between an inwardly-facing-surface of the mounting member and an outwardly-facing surface of the protective liner; and an attachment member configured to be attached to the protective liner via at least one leg member having a first foot portion and a second foot portion opposite the first foot portion, the first foot portion being attached to the attachment member via at least a first fastener and the second foot portion being attached to the protective liner via at least a second fastener. The mounting member includes a spherical portion including an arcuate exterior-facing surface and the attachment member includes a tubular portion including an interior-facing surface that defines a socket that receives the exterior-facing surface of the mounting member and permits the exterior-facing surface of the mounting member to move relative to the attachment member with both radial and rotational freedom within the socket defined by the interior-facing surface of the attachment member.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An apparatus for attaching a protective liner to an aircraft engine component, wherein the protective liner and the aircraft engine component have different coefficients of thermal expansion, the apparatus comprising:
    a mounting member configured to be attached to the aircraft engine component, wherein the mounting member includes a first portion and a second portion extending from the first portion, and wherein the second portion includes an exterior surface; and
    an attachment member configured to be attached to the protective liner, wherein the attachment member includes a first portion and a second portion extending from the first portion of the attachment member, wherein the second portion of the attachment member has an interior surface that defines a socket;
    wherein the mounting member and the attachment member are coupled to each other such that the second portion of the mounting member is at least in part received within an interior of the socket defined by the interior surface of the second portion of the attachment member, and such that the exterior surface of the second portion of the mounting member engages the interior surface of the second portion of the attachment member and is permitted to move with both radial and rotational freedom relative to the interior surface of the second portion of the attachment member while engaged to the interior surface of the second portion of the attachment member.

2. The apparatus of claim 1, wherein the mounting member includes an opening, and further comprising a fastener configured to pass through a portion of the opening and attach the mounting member to the aircraft engine component.

3. The apparatus of claim 2, wherein a head of the fastener is recessed in the aircraft engine component such that no portion of the head of the fastener protrudes above an exterior surface of the aircraft engine component.

4. The apparatus of claim 2, wherein a head of the fastener is located between an inwardly-facing surface of the mounting member and the protective liner, and wherein a shaft of the fastener extends through the aircraft engine component and partly extends above an exterior surface of the aircraft engine component.

5. The apparatus of claim 1, further comprising at least one leg member having a first foot portion and a second foot portion opposite the first foot portion, the first foot portion being attached to the attachment member and the second foot portion being attached to the protective liner.

6. The apparatus of claim 5, wherein the first foot portion of the at least one leg member includes a first through opening and is attached to the attachment member via at least one rivet, and wherein the second foot portion of the at least one leg member includes a second through opening and is attached to the protective liner via a bolt.

7. The apparatus of claim 6, further comprising at least one thermal spacer positioned between the second foot portion of the at least one leg member and a nut coupled to a threaded portion of the bolt.

8. The apparatus of claim 6, wherein a head of the bolt is recessed in the protective liner such that no portion of the head of the bolt protrudes below an interior surface of the protective liner.

9. The apparatus of claim 1, wherein the first portion of the mounting member is a plate-like portion and the second portion of the mounting member is a spherical portion extending from the plate-like portion, and wherein the first portion of the attachment member is a plate-like portion and the second portion of the attachment member is a tubular portion extending from the plate-like portion of the attachment member.

10. The apparatus of claim 9, wherein the plate-like portion of the mounting member includes an outwardly-facing surface in contact with the aircraft engine component and an inwardly-facing surface opposite the outwardly-facing surface, and wherein the spherical portion of the mounting member includes an inwardly-facing surface that is spaced from an outwardly-facing surface of the protective liner.

11. The apparatus of claim 9, wherein the plate-like portion of the attachment member includes an outwardly-facing surface that is separated by a gap from an inwardly-facing surface of the plate-like portion of the mounting member, and wherein the tubular portion of the attachment member includes an inwardly-facing surface that is spaced from an outwardly-facing surface of the protective liner.

12. The apparatus of claim 11, wherein an inwardly-facing surface of the spherical portion of the mounting member and the inwardly-facing surface of the tubular portion of the attachment member are aligned to be planar relative to each other.

13. The apparatus of claim 1, wherein the second portion of the mounting member includes a first portion and a second portion, wherein a diameter of the second portion of the second portion of the mounting member is greater than a diameter of the first portion of the second portion of the mounting member.

14. The apparatus of claim 13, wherein the first portion of the attachment member includes an opening that has a diameter that is greater than the diameter of the first portion of the second portion of the mounting member and that permits the first portion of the second portion of the mounting member to pass through the opening in the first portion of the attachment member and to move radially and rotationally within the opening in the first portion of the attachment member.

15. The apparatus of claim 14, wherein the diameter of the opening in the first portion of the attachment member is smaller than the diameter of the second portion of the second portion of the mounting member to restrict the second portion of the second portion of the mounting member from exiting from the socket by passing through the opening in the first portion of the attachment member.

16. A system for attaching a protective liner to a an aircraft engine component, wherein the protective liner and the aircraft engine component have different coefficients of thermal expansion, the system comprising:
   a mounting member including a threaded opening;
   a fastener that passes through the aircraft engine component and through the threaded opening in engagement with the mounting member and attaches the mounting member to the aircraft engine component, wherein a portion of a shaft of the fastener is retained in the aircraft engine component, and wherein a head of the fastener is retained in the aircraft engine component or extends outwardly relative to an outwardly-facing surface of the aircraft engine component; and
   an attachment member configured to be attached to the protective liner via at least one leg member having a first foot portion and a second foot portion opposite the first foot portion, the first foot portion being attached to the attachment member via at least a first fastener and the second foot portion being attached to the protective liner via at least a second fastener;
   wherein the mounting member includes a spherical portion including an arcuate exterior-facing surface, and the attachment member includes a tubular portion including an interior-facing surface that defines a socket that receives the exterior-facing surface of the spherical portion of the mounting member and permits the exterior-facing surface of the spherical portion of the mounting member to move relative to the interior-facing surface of the tubular portion of the attachment member with both radial and rotational freedom within the socket defined by the interior-facing surface of the tubular portion of the attachment member while the exterior-facing surface of the spherical portion of the mounting member is engaged to the interior surface of the tubular portion of the attachment member.

17. A system for attaching a protective liner to a an aircraft engine component, wherein the protective liner and the aircraft engine component have different coefficients of thermal expansion, the system comprising:
   a mounting member including a threaded opening;
   a fastener that passes through the aircraft engine component and through the threaded opening in engagement with the mounting member and attaches the mounting member to the aircraft engine component, wherein a portion of a shaft of the fastener is retained within the aircraft engine component, and wherein a head of the fastener is located between an inwardly-facing-surface of the mounting member and an outwardly-facing surface of the protective liner; and
   an attachment member configured to be attached to the protective liner via at least one leg member having a first foot portion and a second foot portion opposite the first foot portion, the first foot portion being attached to the attachment member via at least a first fastener and the second foot portion being attached to the protective liner via at least a second fastener;
   wherein the mounting member includes a spherical portion including an arcuate exterior-facing surface, and the attachment member includes a tubular portion including an interior-facing surface that defines a socket that receives the exterior-facing surface of the spherical portion of the mounting member and permits the exterior-facing surface of the spherical portion of the mounting member to move relative to the interior-facing surface of the tubular portion of the attachment member with both radial and rotational freedom within the socket defined by the interior-facing surface of the tubular portion of the attachment member while the exterior-facing surface of the spherical portion of the mounting member is engaged to the interior surface of the tubular portion of the attachment member.

* * * * *

UNITED STATES PATENT AND TRADEMARK OFFICE
CERTIFICATE OF CORRECTION

| | | |
|---|---|---|
| PATENT NO. | : 11,788,491 B1 | Page 1 of 1 |
| APPLICATION NO. | : 17/863993 | |
| DATED | : October 17, 2023 | |
| INVENTOR(S) | : Direnzi et al. | |

It is certified that error appears in the above-identified patent and that said Letters Patent is hereby corrected as shown below:

On the Title Page

In Item (57), under "ABSTRACT", in Column 2, Line 1, delete "a an" and insert -- an --, therefor.

In the Claims

In Column 17, Claim 16, Line 17, delete "a an" and insert -- an --, therefor.

In Column 18, Claim 17, Line 8, delete "a an" and insert -- an --, therefor.

Signed and Sealed this
Thirtieth Day of January, 2024

Katherine Kelly Vidal
*Director of the United States Patent and Trademark Office*